Patented Feb. 3, 1948

2,435,399

UNITED STATES PATENT OFFICE 2,435,399

PROCESS FOR THE PREPARATION OF INDOLALHYDANTOIN

John E. Livak and Maxton F. Murray, Midland, Mich., assignors to The Dow Chemical Company, Midland, Mich., a corporation of Delaware No Drawing. Application October 23, 1944, Serial No. 560,032

4 Claims. (Cl. 260—309.5)

This invention concerns an improved method for the manufacture of tryptophane from 3-indole aldehyde and hydantoin.

Boyd et al., Biochem. J. 29, 2256–8 (1935), have shown that tryptophane may be prepared by reacting 3-indole aldehyde with hydantoin to form indolalhydantoin and reacting the latter with an aqueous ammoniacal solution of ammonium sulphide to form tryptophane. The reactions involved are illustrated by the equations:

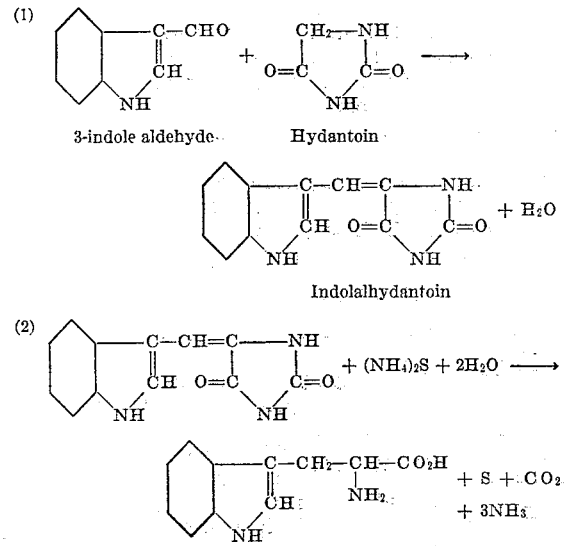

In the process of Boyd et al., the first reaction is carried out by heating 3-indole aldehyde and a slight excess of hydantoin, together with piperidine as a condensing agent, under reflux for about one-half hour. The yield of indolalhydantoin is 65 per cent of theoretical. The second reaction is carried out by heating the indolalhydantoin together with an aqueous solution containing approximately 11 per cent of ammonium sulphide and 0.9 per cent of ammonia in a closed vessel at approximately 100° C. for 500 hours, i. e. about three weeks. The yield of purified tryptophane is reported as being between 55 and 60 per cent of theoretical and, when a further amount of less pure product is considered, the total yield is indicated to be about 70 per cent. Boyd et al. comment that the last-mentioned reaction for the formation of tryptophane may be carried out at higher temperatures in a shorter time, but that practical difficulties attendant on such a procedure render the lower temperatures and the lengthy reaction period preferable. The effect of a higher temperature is illustrated by an example in the Boyd et al. article wherein the reaction between indolalhydantoin and ammonium sulphide was repeated by heating the reactants together with a small amount of alcohol, which apparently was added as a mutual solvent, at a temperature of 150–175° C. for five hours. In this experiment, the yield of tryptophane was only 19.3 per cent of theoretical. According to the examples given in the reference, the overall yield of tryptophane from 3-indole aldehyde and hydantoin under the preferred reaction conditions is 45.5 per cent of theoretical for all of the tryptophane, including the crude fraction of the product, or between 32.5 and 39 per cent for the purified compound. Because of the low overall yield and the time required to carry out the second stage of the process, the method of the reference is not well suited to commercial practice.

We have found that di- and tri-alkanolamines having from 2 to 3 carbon atoms in each alkanol radical, e. g. di-ethanolamine, tri-ethanolamine, di-propanolamine, tri-propanolamine, or ethanol-propanolamine, are far superior to piperidine as condensing agents in the reaction between 3-indole aldehyde and hydantoin and that by employing such alkanolamine as the condensing agent, the intermediate product, indolalhydantoin, may be obtained in high yield. We have further found that the readiness with which the reaction between indolalhydantoin and aqueous ammonium sulphide may be carried out and also the reaction temperatures which may satisfactorily be employed are dependent to a considerable extent upon the concentration of the aqueous ammonium sulphide solution and that by employing in this reaction an aqueous ammonium sulphide solution of between 14 and 25 per cent by weight concentration the reaction may readily be carried out at temperatures of from 140° to 180° C. to obtain tryptophane in good yield. By the employment of such higher temperatures, the reaction for formation of tryptophane may be completed in a relatively short time, e. g. in less than 20 hours and usually in from 3 to 10 hours. On a basis of these discoveries we have devised the following improved method for the production of tryptophane from 3-indole aldehyde and hydantoin.

In preparing tryptophane by the present method, 3-indole aldehyde and between 0.8 and 1.2, preferably about 1, molecular equivalents of hydantoin are admixed with one of the aforementioned alkanolamines. At least one part by weight of the alkanolamine, preferably diethanolamine, is employed per part of the 3-indole aldehyde. The alkanolamine may be used in far greater proportions, if desired, i. e. it may be employed not only as the condensing agent, but also as a medium for the reaction. However, for the purpose of economy, we prefer to use only between 1.5 and 2.5 parts of the alkanolamine per part of the 3-indole aldehyde and to add methanol or ethanol as a medium for the reaction. Usually between 1 and 2 parts by volume of the alcohol is used per part of the alkanolamine, but the alcohol may be employed in smaller or greater proportions.

The mixture is heated with stirring at a temperature of from 50° to 150° C., usually from 50° to 120° C. and, in most instances, from 95° to 100° C. until the formation and precipitation of the reaction product is substantially complete. Usually from 20 minutes to 2 hours is required to carry out the reaction. The mixture is then diluted with an equal volume or more of water or alcohol. It is preferably heated, e. g. to about 50° to 100° C. for 10 minutes or longer, to facilitate extraction of any unreacted starting materials from the insoluble product. The indolalhydantoin is then separated, e. g. by filtration or decantation.

The indolalhydantoin is admixed with between 3 and 12, preferably from 6 to 10, molecular equivalents of ammonium sulphide in the form of an aqueous ammonium sulphide solution of from 14 to 25, preferably from 15 to 18, per cent by weight concentration. The mixture is heated with agitation in a closed vessel, e. g. a bomb or autoclave, at a temperature of from 140° to 180° C., preferably from 150° to 170° C., until the reaction has been completed to the desired extent. The course of the reaction may be followed by withdrawing aliquot portions of the mixture and analyzing to determine the amount of ammonium sulphide consumed. Usually the reaction is substantially complete in less than 10 hours, but longer heating may sometimes be required. After completing the reaction, the reactor is cooled, opened, and the tryptophane product is separated. Procedure for recovering the product is described in the aforementioned Boyd et al. article, Biochem. J. 29, 2256–8 (1935) and need not be repeated.

By operating as just described, tryptophane of high purity may be prepared in reaction periods totaling less than 20 hours and in yields of greater than 50 per cent of theoretical.

The following example illustrates one way in which the principle of the invention has been applied, but is not to be construed as limiting the scope of the invention:

Example

A mixture of 72.5 grams (0.5 mole) of 3-indole aldehyde, 55 grams (0.55 mole) of hydantoin, 150 cc. of diethanolamine, and 200 cc. of methanol was heated on a steam bath with frequent stirring for a period of two hours. At the end of this period the thick yellow slurry which had formed was diluted with 400 cc. of water and heated on the steam bath for about 15 minutes. The mixture was then filtered and the indolalhydantoin, obtained as the residue, was washed with water, digested with 250 cc. of methanol, again separated by filtration, and dried. There was obtained 103 grams of indolalhydantoin of high purity. 2 grams of unreacted 3-indole aldehyde was recovered from the reaction mixture. The yield of indolalhydantoin was 93.2 per cent of theoretical, based on the 3-indole aldehyde consumed in the reaction. 60 grams of the indolalhydantoin was admixed with 880 grams of an aqueous ammonium sulphide solution of 15.8 per cent by weight concentration and the mixture was heated with agitation in an iron autoclave at temperatures of from 150° to 155° C. for 6 hours. The autoclave was then cooled, opened, and the charge removed. The reacted mixture was evaporated under vacuum to dryness. The solid product, thus obtained, was digested with 300 cc. of methanol and the resultant mixture was filtered. The residue was treated with 250 cc. of a 1-normal aqueous hydrochloric acid solution and the mixture heated at from 50° to 60° C. so as to dissolve the tryptophane product and leave the sulphur, associated therewith, as a residue. The mixture was filtered to remove the sulphur. The filtrate was treated with about 5 grams of activated charcoal, warmed to approximately 50° C. for about 10 minutes, and again filtered. This filtrate was neutralized and permitted to stand for about one-half hour whereby tryptophane, together with iron-containing impurities, was precipitated. The mixture was filtered and the residue was agitated with a dilute aqueous sodium hydroxide solution, leaving the iron impurities as insoluble iron hydroxide which was removed by filtration. The filtrate was neutralized and permitted to stand a few minutes whereby tryptophane was crystallized therefrom. The product was separated by filtration, washed with water and dried. There was obtained 30.7 grams, or 56.9 per cent of the theoretical yield, of substantially pure tryptophane. The overall yield of tryptophane, based on the 3-indole aldehyde consumed in the process, was approximately 53 per cent of theoretical.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for the production of tryptophane from 3-indole aldehyde and hydantoin, the step of heating to a reaction temperature between 50° and 120° C., a mixture of one part by weight of 3-indole aldehyde, approximately its molecular equivalent of hydantoin, and at least one part by weight of an alkanolamine selected from the class consisting of di- and tri-alkanolamines having from 2 to 3 carbon atoms in each alkanol radical.

2. The method as described in claim 1, wherein the alkanolamine is di-ethanolamine, between 1.5 and 2.5 parts by weight of di-ethanolamine is employed per part of the 3-indole aldehyde, at least one part by volume of methanol is initially added per part of the di-ethanolamine, and the reaction is carried out for the most part at temperatures between 95° and 100° C.

3. A method which comprises forming indolalhydantoin by reacting 3-indole aldehyde with hydantoin in the presence of an alkanolamine selected from the class consisting of di- and trialkanolamines having from 2 to 3 carbon atoms in each alkanol group.

4. A method which comprises forming indolalhydantoin by heating, to a reaction temperature between 50° and 120° C., a mixture of one part by weight of 3-indole aldehyde, approximately its molecular equivalent of hydantoin, and at least one part by weight of an alkanolamine selected from the class consisting of di- and trialkanolamines having from 2 to 3 carbon atoms in each alkanol radical, and separating indolalhydantoin from the reacted mixture.

JOHN E. LIVAK.
MAXTON F. MURRAY.

REFERENCES CITED

The following references are of record in the file of this patent:

Majima et al., Ber. Deut. Chem., vol. 55 (1922), pp. 3859–3865.

Boyd et al., Biochem. J., vol. 29 (1935), pp. 2256–2258.

Boyd et al., Chemical Abstracts, vol. 29 (1935), p. 5094, citing: Biochem. J., vol. 29 (1935), pp. 542–545.